United States Patent Office 3,274,836
Patented Sept. 27, 1966

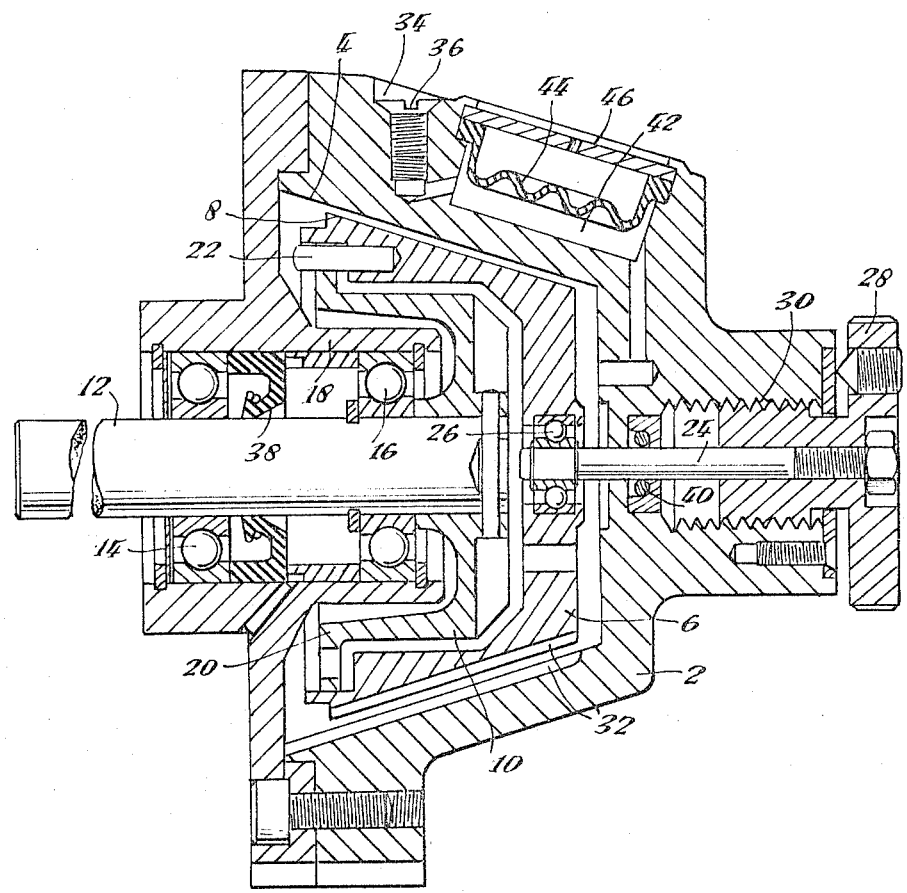

3,274,836
ROTARY DAMPERS
Alan Richard Brine Nash, 39 Abbot's Ride,
Farnham, Surrey, England
Filed Oct. 1, 1963, Ser. No. 313,107
Claims priority, application Great Britain, Oct. 5, 1962,
37,684/62
10 Claims. (Cl. 74—574)

This invention relates to damping devices and is particularly concerned with continuous rotation dampers in contrast to semi-rotary dampers which operate only over a given arc of a circle.

According to the invention, there is provided a continuous rotation damper comprising a circular cross-section rotor journalled within a chamber having an inner wall co-axial with and adjacent to the rotor periphery, the space therebetween being filled with a damping fluid.

It is often desirable to be able to alter the damping rate obtained and, to this end, in a preferred form of the invention, the rotor periphery is frusto-conical, the chamber inner wall being correspondingly shaped, and the rotor is axially adjustable relative to said wall to control the clearance between them. Such a damper can be controlled without disassembly by providing an axially directed push-rod bearing at one end upon the rotor and projecting outwardly of an adjustable connection with the casing to provide an external control of the axial position of the rotor.

One preferred embodiment of a continuous rotation damper according to the invention is shown in section in the accompanying drawing.

Referring to the drawing, the damper comprises a casing 2 having an inner frusto-conical wall 4 defining a chamber within which rotor 6 with a corresponding frusto-conical periphery 8 is located.

A rotor-mounting member or spider 10 has an externally projecting shaft 12 fixed to it and this assembly is journalled to the casing on spaced ball races 14, 16 the inner race 16 being held by a sleeve 18 integral with the end wall of the casing and projecting into the envelope of the rotor. The member 10 extends between this sleeve and the rotor to terminate at a radially directed flange 20, the outer face of which fits a complementary surface of the rotor body and thereby forms a radial registration for the rotor ensuring that it is coaxial with the inner wall of the casing. The flange 20 also carries a series of driving pins 22, only one of which can be seen, which transmit to the rotor a torque applied to the member 10 through its shaft 12.

The form of connection between the rotor and its mounting member permits the rotor to be moved axially relative to the casing so as to alter its clearance with the inner wall 4. To enable such an adjustment to be carried out, a push-rod 24 is attached to the end face of the rotor through a thrust race 26, its other end being fixed to a control knob 28 and having a screwed connection 30 with the casing. Other forms of connection can be provided between the rod 24 and the casing, e.g., a groove and pin or a cam and follower. Thus, even while the device is in operation, the knob 28 can be turned to adjust the damping rate.

At high rates of rotation, the stress in the fluid caused by viscous shear may be high enough to break down the fluid layer and cause a fall-off in the damping rate. This effect may be reduced by providing lengthwise grooves 32 in the rotor periphery and/or in the casing inner wall. When series of grooves are in both surfaces it is desirable to make their respective angular spacings slightly different to avoid cyclical variation in the damping rate; for example, there could be twelve grooves in the wall 4 and eleven in the rotor periphery 8.

The damping fluid may be introduced through a filler hole 34 normally closed by a sealing screw 36. The fluid is retained within the damper by an annular flexible lip seal 38 on the shaft 12 and an O-ring 40 on the push-rod 24. However, thermal expansion and variations in volume due to the displacement of the push-rod can produce pressure variations that cause fluid to be forced out of the chamber or air to be drawn in. To overcome this, a compensation chamber 42, its outer face defined by a diaphragm 44 of rubber or similar flexible material having circular corrugations, is provided. Large fluctuations of pressure due to volume changes within the device are therefore avoided by the flexing of the diaphragm. An apertured washer 46 seats over the diaphragm to protect it from external damage.

What I claim and desire to secure by Letters Patent is:

1. A continuous rotation fluid filled damper comprising, in combination, a rotor having a frusto-conical surface, a casing surrounding the rotor, and a support structure, said support structure being rotatably mounted within said casing and being journalled in said casing, said support structure relatively slidably engaging said rotor to maintain the frusto-conical rotor surface coaxial with the correspondingly shaped inner surface of the casing coacting with said rotor surface despite axial movement of the rotor with respect to said support structure, and an adjustable securing device coupled between the rotor and the casing to control the axial position of the rotor in the casing and therefore to control the spacing between said frusto-conical surface on said rotor and said correspondingly shaped inner surface of said casing.

2. A damper according to claim 1 wherein said support structure includes a rotor mounting member and a driving shaft secured thereto and projecting outwardly of the casing, the rotor mounting member comprising a radial registration element and at least one axially extending element slidably engaging a complementary element of the rotor to transmit the driving shaft torque thereto.

3. A device according to claim 2 wherein a complementary element for co-operation with said radial registration element is provided on the rotor adjacent the periphery of its larger diameter end.

4. A damper according to claim 1 wherein the casing comprises an inner sleeve projecting into the envelope of the rotor periphery, said sleeve carrying a bearing for the rotor support structure.

5. A damper according to claim 1 having an axially directed push-rod bearing, at one end, upon the rotor and projecting externally of the casing, a connection intermediate its length adjustably engaging the casing, the rod thereby providing an external control of the axial position of the rotor.

6. A damper according to claim 1 wherein a series of lengthwise grooves is provided in at least one of said co-acting surfaces.

7. A damper according to claim 1 wherein a chamber is provided in the casing spaced from but in communication with the space between said co-acting surfaces, a wall of the chamber being formed by a flexible diaphragm, the other side of which is in communication with atmosphere so as to provide pressure compensation means for the fluid within the damper.

8. A continuous rotation fluid-filled damper comprising, in combination, a rotor having a frusto-conical periphery, a casing surrounding the rotor and having a correspondingly shaped inner wall co-acting with the rotor periphery, a support structure maintaining the rotor coaxial with the casing inner wall and comprising a shaft journalled to the casing adjacent the larger diameter end of the inner wall, a rotor mounting member secured to the shaft having a radial registration surface engaging the rotor adjacent its larger diameter end and rotational driving elements transmitting the shaft torque to the rotor, both engagement means between the member and the rotor permitting relative axial movement, an adjustment device secured to the rotor adjacent its smaller diameter and projecting outwardly of the casing and spiral engagement means between said device and the casing whereby rotation of the adjustment device moves the rotor axially upon its mounting member to alter the spacing between the rotor periphery and the casing inner wall.

9. A continuous rotation damper comprising, in combination, a rotor having a frusto-conical surface, a stator surface of complementary form coaxially spaced from said rotor surface, a casing defining an enclosed space within which said surfaces are located, said space being filled with a damping fluid, external rotary connection means attached to the rotor forming a unit therewith which is journalled to the casing, and adjustable securing device being carried by the casing to project externally therefrom and being connected relative to both said surfaces to control the axial spacing therebetween, a boundary portion of the casing wall between said fluid-filled space and atmosphere being defined by a flexible sealing member, said member thereby providing a pressure compensation device for the fluid within the damper.

10. A continuous rotation fluid filled damper comprising, in combination, a casing, a rotor, and a stator within said casing, said rotor and stator comprising coaxially adjacent complementary frusto-conical surface elements, rotary drive means attached to the rotor and forming a unit therewith which is journalled to the casing, the space between the surfaces of said stator and said rotor surface elements being filled with a damping fluid, and adjustment means mounted upon said casing to vary the spacing between said stator and rotor surface elements, at least one of said surface elements having a plurality of grooves running transversely to the direction of rotation.

References Cited by the Examiner

UNITED STATES PATENTS 2,831,369    4/1958    Cohn _____ 74—573

FOREIGN PATENTS 732,706    6/1955    Great Britain.
828,266    7/1957    Great Britain.

FRED C. MATTERN, Jr., *Primary Examiner.*

MILTON KAUFMAN, BROUGHTON G. DURHAM, *Examiners.*

W. S. RATLIFF, *Assistant Examiner.*